US010768632B2

(12) United States Patent
Hüger

(10) Patent No.: US 10,768,632 B2
(45) Date of Patent: Sep. 8, 2020

(54) DEVICE AND METHOD FOR AUTOMATED, SEMI AUTOMATED, OR ASSISTED MANEUVERING OF A MOTOR VEHICLE

(71) Applicant: VOLKSWAGEN AG, Wolfsburg (DE)

(72) Inventor: Philipp Hüger, Rühen (DE)

(73) Assignee: VOLKSWAGEN AG, Wolfsburg (DE)

( * ) Notice: Subject to any disclaimer, the term of this patent is extended or adjusted under 35 U.S.C. 154(b) by 335 days.

(21) Appl. No.: 15/880,668

(22) Filed: Jan. 26, 2018

(65) Prior Publication Data

US 2018/0217608 A1  Aug. 2, 2018

(30) Foreign Application Priority Data

Feb. 1, 2017 (DE) .................. 10 2017 201 620

(51) Int. Cl.
*G05D 1/02* (2020.01)
*G06T 7/579* (2017.01)
(Continued)

(52) U.S. Cl.
CPC ......... *G05D 1/0246* (2013.01); *G05D 1/0212* (2013.01); *G05D 1/0253* (2013.01); *G06K 9/00791* (2013.01); *G06K 9/209* (2013.01); *G06T 7/20* (2013.01); *G06T 7/579* (2017.01); *G06T 7/70* (2017.01); *G05D 2201/0213* (2013.01); *G06K 2209/21* (2013.01);
(Continued)

(58) Field of Classification Search
CPC .. G05D 1/0246; G05D 1/0253; G05D 1/0212; G05D 2201/0213; G06T 7/579; G06T 7/20; G06T 7/70; G06T 2207/10016; G06T 2207/30252; G06T 2207/30241; G06T 2200/04; G06K 9/209; G06K 9/00791; G06K 2209/21
See application file for complete search history.

(56) References Cited

U.S. PATENT DOCUMENTS

2002/0145662 A1* 10/2002 Mizusawa ................ B60D 1/36
348/118
2003/0122687 A1* 7/2003 Trajkovic ............... B60Q 9/005
340/932.2
(Continued)

FOREIGN PATENT DOCUMENTS

DE  102012001380 A1  8/2012

*Primary Examiner* — Thomas Ingram
(74) *Attorney, Agent, or Firm* — Barnes & Thornburg LLP

(57) ABSTRACT

An apparatus for automated, partly automated or assisted maneuvering of a motor vehicle from a start point to a 3D target position including a mono camera and an evaluation and control unit, wherein the evaluation and control unit has at least one structure-from-motion algorithm, wherein the evaluation and control unit calculates a maneuvering trajectory composed of three partial trajectories, wherein a first partial trajectory leads from the start point to a first intermediate point, a second partial trajectory leads from the first to a second intermediate point, and the third partial trajectory leads from the second intermediate point to the target point, wherein at least the first or at least the second partial trajectory is embodied so the mono camera captures the target position from at least two different viewing directions, wherein the viewing directions are selected so the 3D determination of the structure-from-motion is optimized.

11 Claims, 1 Drawing Sheet

(51) Int. Cl.
*G06T 7/70* (2017.01)
*G06K 9/00* (2006.01)
*G06K 9/20* (2006.01)
*G06T 7/20* (2017.01)

(52) U.S. Cl.
CPC ............... *G06T 2200/04* (2013.01); *G06T 2207/10016* (2013.01); *G06T 2207/30241* (2013.01); *G06T 2207/30252* (2013.01)

(56) References Cited

U.S. PATENT DOCUMENTS

| 2009/0243889 A1* | 10/2009 | Suhr ............... G06K 9/00812 340/932.2 |
| 2013/0151060 A1* | 6/2013 | Lee ............... B62D 15/0285 701/25 |

* cited by examiner

DEVICE AND METHOD FOR AUTOMATED, SEMI AUTOMATED, OR ASSISTED MANEUVERING OF A MOTOR VEHICLE

PRIORITY CLAIM

This patent application claims priority to German Patent Application No. 10 2017 201 620.5, filed 1 Feb. 2017, the disclosure of which is incorporated herein by reference in its entirety.

SUMMARY

Illustrative embodiments relate to an apparatus and a method for automated, partly automated or assisted maneuvering of a motor vehicle from a start point to a 3D target position, in particular, the drawbar of a trailer.

The spatial orientation of the drawbar is important for optimized maneuvering of a motor vehicle to a drawbar of a motor vehicle. If, in the process, a stereo camera or time-of-flight camera is used for a maneuvering process, a 3D position of the drawbar can be ascertained from the image data and it is possible to determine a corresponding trajectory for the maneuvering process. By contrast, if only a mono camera is available, a 3D position cannot be generated directly from the image data. This problem can be solved by so-called structure-from-motion algorithms. Structure-from-motion describes the process of calculating the 3D surface using 2D image information from different perspectives or viewing directions of the camera. To be able to calculate 3D points from 2D image data, it is first of all necessary to orient the image block. This is effectuated by a combination of photogrammetric algorithms. Specifically, these are the feature point detection and extraction, assignment of homologous point pairs, relative orientation of image pairs, robust estimators for outlier detection and bundle adjustment.

BRIEF DESCRIPTION OF THE DRAWINGS

The disclosed embodiments will be explained in more detail below on the basis of drawings. In the figures.

DETAILED DESCRIPTION

Figure 1:
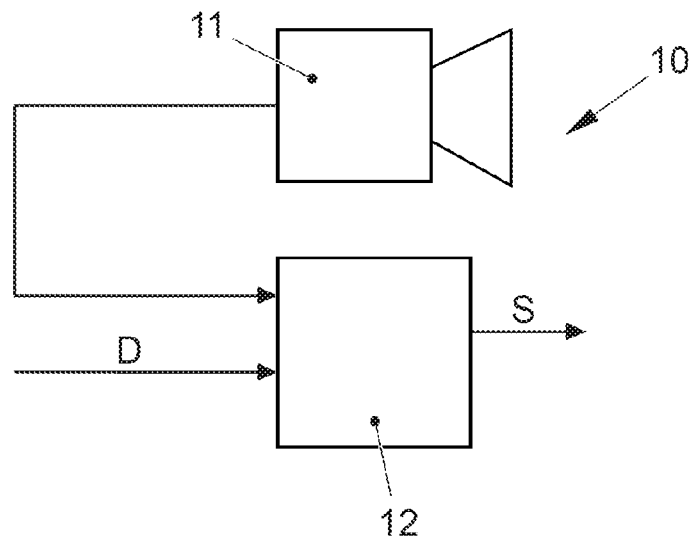
FIG. 1 shows a schematic block diagram of an apparatus for automated, partly automated or assisted maneuvering of a motor vehicle.

Disclosed are an apparatus and a method for automated, partly automated or assisted maneuvering of a motor vehicle from a start point to a 3D target position, in particular, the drawbar of a trailer.

The spatial orientation of the drawbar is important for optimized maneuvering of a motor vehicle to a drawbar of a motor vehicle. If, in the process, a stereo camera or time-of-flight camera is used for a maneuvering process, a 3D position of the drawbar can be ascertained from the image data and it is possible to determine a corresponding trajectory for the maneuvering process. By contrast, if only a mono camera is available, a 3D position cannot be generated directly from the image data. This problem can be solved by so-called structure-from-motion algorithms. Structure-from-motion describes the process of calculating the 3D surface using 2D image information from different perspectives or viewing directions of the camera. To be able to calculate 3D points from 2D image data, it is first of all necessary to orient the image block. This is effectuated by a combination of photogrammetric algorithms. Specifically, these are the feature point detection and extraction, assignment of homologous point pairs, relative orientation of image pairs, robust estimators for outlier detection and bundle adjustment.

DE 10 2012 001 380 A1 has disclosed an assistance method for a coupling maneuver of a motor vehicle with a trailer coupling to a trailer coupling cup by a driver assistance system having at least one backup camera, a screen, an image evaluation unit, a calculation unit, an image superposition unit and an input interface, comprising the following operations:

recording an image with the backup camera, at least one coupling cup lying in the capturing region thereof, and displaying the image on the screen, capturing a steering angle of the steering wheel of the motor vehicle by a steering angle sensor, with the steering wheel forming the input interface, predetermining a region within the recorded image for the image evaluation unit for the purposes of identifying the coupling cup by the steering angle, calculating a trajectory between the trailer coupling of the motor vehicle and the coupling cup of the trailer by way of the calculation unit, superposing the trajectory onto the screen display of the image.

It is also disclosed, in the process, that the method can be performed in an automated or partly automated manner, wherein partly automated should be understood to mean that either the longitudinal or the transverse guidance is automated. Further processes for assistance when the trailer coupling approaches the coupling cup, in addition to the driver assistance for positioning the trailer coupling under the coupling cup, include, firstly, offering a selection in respect of how the vehicle should be positioned upon hitching but also, secondly, that the system calculates a multi-move maneuvering process, that is to say a plurality of partial trajectories, to arrive at the position with the predetermined spatial orientation and, in the process, take account of further restrictions in the vehicle surroundings, such as obstacles or other vehicles.

Disclosed embodiments provide an apparatus for maneuvering with a mono camera and a suitable method.

To this end, the apparatus for automated, partly automated or assisted maneuvering of a motor vehicle from a start point to a 3D target position, in particular, a drawbar of a trailer, comprises a mono camera and an evaluation and control unit, wherein the evaluation and control unit has at least one structure-from-motion algorithm. Here, the evaluation and control unit is embodied to calculate a maneuvering trajectory which is embodied in such a way that the mono camera captures the target position from at least two different viewing directions, wherein the viewing directions are selected in such a way that the 3D determination of the structure-from-motion algorithm is optimized. Here, optimized should be understood within the meaning of ascertaining as much data as possible, optionally a sufficient amount of data, for the 3D determination. Thus, the point of the trajectory with a plurality of viewing directions is, primarily, to ascertain a sufficient amount of data for the 3D determination, wherein the viewing directions and also, optionally, the number of different viewing directions are thereupon selected such that the maneuvering process can be carried out by starting the maneuvering trajectory.

In at least one disclosed embodiment, the maneuvering trajectory or a partial trajectory of the maneuvering trajectory describes a curved trajectory from the start point to the 3D target position such that the viewing direction changes in each recording of the mono camera.

In a further disclosed embodiment, the maneuvering trajectory is composed of three partial trajectories, wherein a first partial trajectory leads from the start point to a first intermediate point, a second partial trajectory leads from the first intermediate point to a second intermediate point and the third partial trajectory leads from the second intermediate point to the target point. At least the first partial trajectory or at least the second partial trajectory may be generated by the mono camera capturing the target position from at least two viewing directions, wherein the viewing directions are selected in such a way that the 3D determination of the structure-from-motion algorithm is optimized.

In the process, two different approaches are possible as a matter of principle. In a first approach, the first partial trajectory is calculated in such a way that the latter is optimized for the 3D determination. Subsequently, the vehicle is then moved by the second partial trajectory to a second intermediate position, from which the maneuvering process can then be completed by means of the third partial trajectory. Thus, in this approach, the partial trajectory that is optimized for the structure-from-motion algorithm is used at the beginning, the goal of the first partial trajectory not being that of completing the maneuvering process but only of supplying a sufficient amount of data.

The second approach relates to a correction of a failed maneuvering process. Here, the first partial trajectory leads to the target point, with an attempt being made to already complete the maneuvering process within the scope of the first partial trajectory. To address the issue that it is not possible to ascertain a sufficient number of feature points for an accurate 3D determination on account of the first partial trajectory, a second partial trajectory may be calculated, wherein the second partial trajectory is moving away from the target point again; in the process, the second partial trajectory may capture a sufficient number of new feature points by way of different viewing directions so that it is then possible to complete the maneuvering process by way of the third partial trajectory. Therefore, both the first partial trajectory and the second partial trajectory may be optimized for the structure-from-motion algorithm in this disclosed embodiment. However, it is possible to optimize the first partial trajectory in view of the approach (e.g., a plurality of straight partial sections), wherein, in the case of an insufficient data base, the latter is filled by optimizing the second partial trajectory.

In the case of the fully automated maneuvering process, the apparatus takes over the complete longitudinal and transverse guidance in the process. In the case of the partly automated guidance, the apparatus takes over, e.g., the transverse guidance, whereas the longitudinal guidance (acceleration and braking) is effectuated by the vehicle driver. By contrast, in the case of assisted maneuvering, the vehicle driver is only provided with an illustration of the trajectory on a display unit and the driver must independently drive along the trajectory (optionally with steering torque recommendations to simplify driving along the trajectory).

In at least one disclosed embodiment, the first intermediate point is the target position since the accuracy of the 3D determination increases the closer the mono camera comes to the target point.

In a further disclosed embodiment, the evaluation and control unit produces control signals for a steering actuator system. In addition to convenience, an automated or partly automated maneuvering process allows the trajectories to be driven more accurately, which is important for securing a sufficient data base for the structure-from-motion algorithm.

In respect of the configuration according to the method, reference is made fully to the explanations made above.

An apparatus 10 for automated, partly automated or assisted maneuvering of a motor vehicle from a start point SP (see FIG. 2 and FIG. 3) to a 3D target position ZP (see FIG. 2 and FIG. 3) is illustrated in FIG. 1, wherein the 3D target position is, e.g., the drawbar of a trailer. The apparatus 10 has a mono camera 11 which, for example, serves as a backup camera of the motor vehicle. Moreover, the apparatus 10 has an evaluation and control unit 12 having a structure-from-motion algorithm. The evaluation and control unit 12 receives the data from the mono camera 11 and movement data D from the motor vehicle. From these two sets of data, the evaluation and control unit 12 determines a 3D surface calculation of the surroundings, in particular, of the target position ZP. Then, depending on the embodiment, the evaluation and control unit 12 produces control signals S for a steering actuator system and/or for a longitudinal dynamics actuator system and/or for a display unit.

To this end, the evaluation and control unit 12 calculates a maneuvering trajectory R, which is composed of one or three partial trajectories 1-3.

Figure 2:
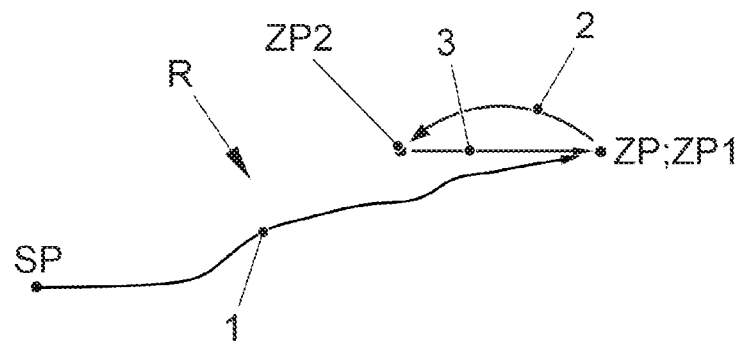
FIG. 2 shows a schematic illustration of the three partial trajectories in a first embodiment.
Figure 3:
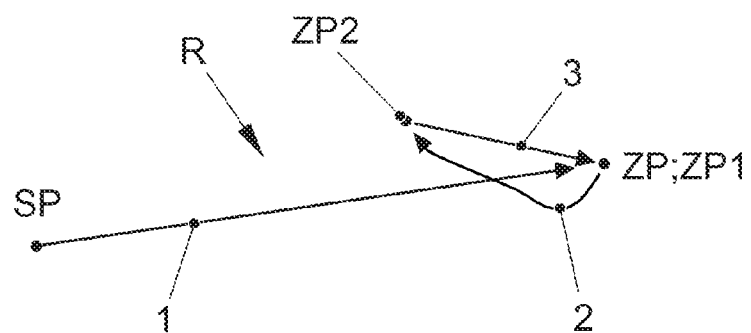
FIG. 3 shows a schematic illustration of the three partial trajectories in a second embodiment.

This should now be explained in more detail on the basis of FIG. 2 and FIG. 3.

In a first disclosed embodiment, the evaluation and control unit 12 initially calculates a first partial trajectory 1, which is selected in such a way that the mono camera 11 captures the target position ZP from at least two different viewing directions, optionally from a greater number thereof. As a result of this, the data base for the structure-from-motion algorithm is optimized. Thus, this first partial trajectory 1 serves to improve the 3D determination. In the ideal case, the maneuvering process then is completed with the first partial trajectory 1. However, what may happen is that the obtained data base is insufficient or else that the motor vehicle has an inexpedient position in relation to the 3D target position. Then, the evaluation and control unit 12 calculates a second partial trajectory 2 to a second intermediate point ZP2 (in the illustrated example, the target position ZP is the same as the first intermediate position ZP1 of the first partial trajectory 1). Here, the second partial trajectory 2 is selected in such a way that further 3D determinations may be carried out so that the maneuvering process can then be completed with the third partial trajectory 3. Here, the second intermediate point ZP2 may be selected in such a way that it is possible to drive to the target position ZP along a virtually straight third partial trajectory 3. In this case, the viewing direction of the mono camera 11 in relation to the target position ZP does not change. Here, provision can further be made for the maneuvering process to be designed to have three partial trajectories in advance. Here, the first partial trajectory 1 is only optimized for the 3D determination, without the completion of the maneuvering process being intended.

FIG. 3 illustrates a second disclosed embodiment. Here, the evaluation and control unit 12 calculates a first partial trajectory 1 which leads virtually along a straight line to the target position ZP for the purposes of carrying out the maneuvering process. Should this be successful, the maneuvering process is complete. However, should the data base collected on the journey along the first partial trajectory 1 be too inaccurate for the 3D determination, the maneuvering process will not be successful. Now, the evaluation and control unit 12 calculates a second partial trajectory 2, in which the viewing direction in relation to the target position ZP changes to optimize the data base for the structure-from-motion algorithm. Then, the endpoint of the second partial trajectory 2 is the second intermediate point ZP2, wherein a third partial trajectory 3 is then calculated from the latter to complete the maneuvering process.

The invention claimed is:

1. An apparatus for automated, partly automated or assisted maneuvering of a motor vehicle from a start position to a 3D target position, the apparatus comprising:
   a mono camera; and
   an evaluation and control unit, wherein the evaluation and control unit includes at least one structure-from-motion algorithm, wherein the evaluation and control unit calculates a maneuvering trajectory, wherein the maneuvering trajectory is calculated based on data captured by the mono camera including image data capturing the target position viewed from at least two different viewing directions, wherein the viewing directions are selected based on whether a sufficient amount of image data has been ascertained in order to determine the 3D target position performed by the structure-from-motion algorithm,
   wherein each viewing direction is based on a direction the motor vehicle is traveling along the maneuvering trajectory.

2. The apparatus of claim 1, wherein the maneuvering trajectory or a partial trajectory of the maneuvering trajectory is a curved trajectory from the start position to the 3D target position.

3. The apparatus of claim 1, wherein the maneuvering trajectory is composed of three partial trajectories, wherein a first partial trajectory leads from the start position to a first intermediate position, a second partial trajectory leads from the first intermediate position to a second intermediate position and the third partial trajectory leads from the second intermediate position to the target position, wherein at least the first partial trajectory or at least the second partial trajectory is calculated based on data captured by the mono camera including image data capturing the target position viewed from at least two different viewing directions, wherein the viewing directions are selected based on whether a sufficient amount of image data has been ascertained in order to determine the 3D target position performed by the structure-from-motion algorithm.

4. The apparatus of claim 3, wherein the first intermediate position is the target position.

5. The apparatus of claim 1, wherein the evaluation and control unit produces control signals for a steering actuator system.

6. A method for automated, partly automated or assisted maneuvering of a motor vehicle from a start position to a target position, the method comprising:
   a mono camera capturing image data capturing the target position viewed from at least two different viewing directions; and
   an evaluation and control unit, including at least one structure-from-motion algorithm, calculating a maneuvering trajectory based on the data captured by the mono camera,
   wherein the viewing directions are selected based on whether a sufficient amount of image data has been ascertained in order to determine the 3D target position performed by the structure-from-motion algorithm,
   wherein each viewing direction is based on a direction the motor vehicle is traveling along the maneuvering trajectory.

7. The method of claim 6, wherein the maneuvering trajectory or a partial trajectory of the maneuvering trajectory is a curved trajectory from the start position to the 3D target position.

8. The method of claim 6, wherein the maneuvering trajectory is composed of three partial trajectories, wherein a first partial trajectory leads from the start position to a first intermediate position, a second partial trajectory leads from the first intermediate position to a second intermediate position and the third partial trajectory leads from the second intermediate position to the target position, wherein at least the first partial trajectory or at least the second partial trajectory is calculated based on data captured by the mono camera including image data capturing the target position viewed from at least two different viewing directions, wherein the viewing directions are selected based on whether a sufficient amount of image data has been ascertained in order to determine the 3D target position performed by the structure-from-motion algorithm.

9. The method of claim 8, wherein the target position is selected as first intermediate point.

10. The method of claim 8, wherein the first partial trajectory is calculated based on image data captured by the mono camera including image data capturing the target position viewed from at least two viewing directions, wherein the second intermediate position is ascertained so the viewing direction of the mono camera toward the target position is maintained constant along the third partial trajectory.

11. A method for automated, partly automated or assisted maneuvering of a motor vehicle from a start position to a target position, the method comprising:
   a mono camera capturing image data capturing the target position viewed from at least two different viewing directions; and
   an evaluation and control unit, including at least one structure-from-motion algorithm, calculating a maneuvering trajectory based on the data captured by the mono camera,
   wherein the viewing directions are selected based on whether a sufficient amount of image data has been ascertained in order to determine the 3D target position performed by the structure-from-motion algorithm,
   wherein the maneuvering trajectory is composed of three partial trajectories, wherein a first partial trajectory leads from the start position to a first intermediate position, a second partial trajectory leads from the first intermediate position to a second intermediate position and the third partial trajectory leads from the second intermediate position to the target position, wherein at least the first partial trajectory or at least the second partial trajectory is calculated based on data captured by the mono camera including image data capturing the target position viewed from at least two different viewing directions, wherein the viewing directions are selected based on whether a sufficient amount of image data has been ascertained in order to determine the 3D target position performed by the structure-from-motion algorithm, and
   wherein the first partial trajectory is calculated based on image data captured by the mono camera including image data capturing the target position viewed from at least two viewing directions, wherein the second intermediate position is ascertained so the viewing direction of the mono camera toward the target position is maintained constant along the third partial trajectory.

* * * * *